L. BROWN & J. & J. LELAND.
Car-Axle.
No. 27,966.
Patented Apr. 24, 1860.
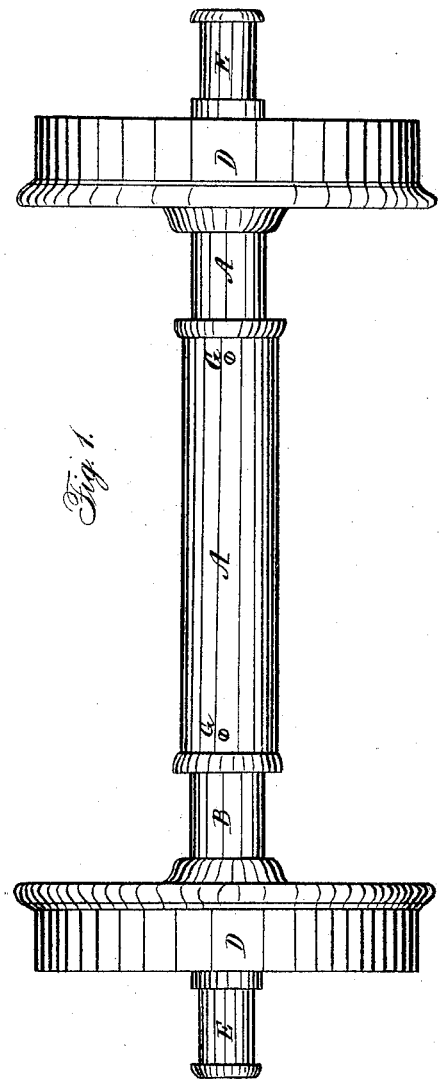
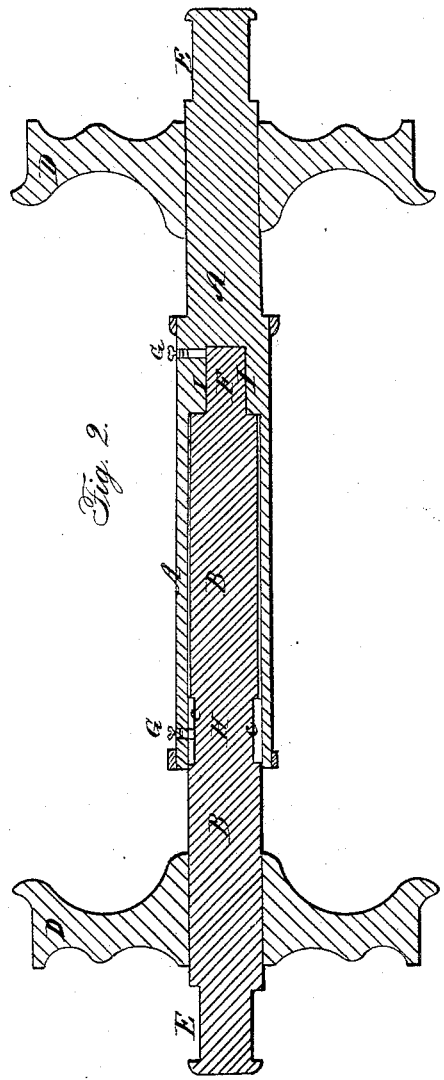
Witnesses:
Edward L. Davis
Samuel D. Nye
Inventor:
Lyman Brown
James Leland
John Leland

UNITED STATES PATENT OFFICE.

L. BROWN, JAS. LELAND, AND JNO. LELAND, OF WORCESTER, MASSACHUSETTS.

CAR-AXLE.

Specification of Letters Patent No. 27,966, dated April 24, 1860.

*To all whom it may concern:*

Be it known that we, LYMAN BROWN, JAMES LELAND, and JOHN LELAND, all of Worcester, in the county of Worcester and Commonwealth of Massachusetts, have invented a new and useful Railroad-Car Axle; and we do hereby declare that the following is a full and exact description of the construction and operation of the same, reference being had to the annexed drawings, making a part of this specification, in which—

Figure 1 is an elevation view and Fig. 2 is a sectional view.

The nature of our invention consists of a compound axle, one part of which is a male or spindle part, and the other a female or tubular part, each part by itself to be made as strong, or nearly so, as a common, or single axle. The two above named parts are connected or held together by a quill, box, or bearing, made in two or more parts, and fitted to a bearing at or near the center of spindle and pressed into, or otherwise confined in the end or mouth of the tubular part, the end of each part being connected with, and having a bearing on its opposite part, at or near the center, and held together by the above named quill, or box, and when constructed as above specified and as shown in the accompanying drawings, it makes a very strong axle and a safe one to use with weight or speed. The two parts may act in concert or separately (say when rounding a curve).

The advantage of this compound axle over a common or single one, is three fold: It will round a curve with less wear to the wheel, and rail, with less propelling power and is less liable to break by avoiding the great strain to which the common axle is unavoidably subjected.

To enable others skilled in the art to make and use our invention, we will proceed to describe its construction, and operation.

In drawings of the two Figs. 1 and 2, A, A, is the female or tubular part and B, on Fig. 1 and B, B, on Fig. 2 is the male or spindle part of the axle.

C, C, on Fig. 2 is the quill, box, or bearing, in two or more parts connecting and securing the two parts A and B, and likewise forming one of the bearings for spindle part B, B, as shown on Fig. 2 at H, to turn in.

D, D, are the two car wheels.

E, E, are the two carriage box bearings.

G, G, are the two oil holes stopped by screws.

H, on Fig. 2 is the bearing that runs in quill, or box C, C.

F, on Fig. 2, is the bearing at the end of spindle or male part B, B, which turns in a recess at or near the center of tubular part A, A, and as seen at D, D, thus combining the two parts.

What we claim as our invention and desire to secure by Letters Patent is—

1. The quill, box, or bearing, C, C, accomplishing the double purpose of connecting and securing the two parts of axle A and B and making one of the two bearings as above specified.

2. We claim the recess I, I, the bearings F and H substantially as specified.

LYMAN BROWN.
JAMES LELAND.
JOHN LELAND.

Witnesses:
W. A. WILLIAMS,
ANDREW I. MEITRE.